(12) United States Patent
Kim et al.

(10) Patent No.: US 11,094,942 B2
(45) Date of Patent: Aug. 17, 2021

(54) METHOD FOR MANUFACTURING AN ELECTRODE HAVING A METAL PLATE WITH A RECESS FORMED THEREIN, AN ELECTRODE INCLUDING THE SAME, AND AN ELECTROCHEMICAL DEVICE INCLUDING THE SAME

(71) Applicant: LG Chem, Ltd., Seoul (KR)

(72) Inventors: Dae-Soo Kim, Daejeon (KR);
Dong-Kyu Kim, Daejeon (KR);
Min-Kyung Kim, Daejeon (KR)

(73) Assignee: LG Chem, Ltd.

( * ) Notice: Subject to any disclaimer, the term of this patent is extended or adjusted under 35 U.S.C. 154(b) by 386 days.

(21) Appl. No.: 15/744,264

(22) PCT Filed: Dec. 15, 2016

(86) PCT No.: PCT/KR2016/014752
§ 371 (c)(1),
(2) Date: Jan. 12, 2018

(87) PCT Pub. No.: WO2017/105115
PCT Pub. Date: Jun. 22, 2017

(65) Prior Publication Data
US 2018/0205091 A1    Jul. 19, 2018

(30) Foreign Application Priority Data

Dec. 15, 2015 (KR) .................. 10-2015-0179363
Jul. 7, 2016 (KR) .................. 10-2016-0086369

(51) Int. Cl.
*H01M 4/76* (2006.01)
*H01M 4/75* (2006.01)
(Continued)

(52) U.S. Cl.
CPC ............... *H01M 4/76* (2013.01); *H01M 4/04* (2013.01); *H01M 4/0433* (2013.01); *H01M 4/13* (2013.01);
(Continued)

(58) Field of Classification Search
CPC ........ H01M 4/76; H01M 4/04; H01M 10/052; H01M 4/75; H01M 4/62; H01M 10/04;
(Continued)

(56) References Cited

U.S. PATENT DOCUMENTS

2009/0017377 A1    1/2009   Kogetsu et al.
2011/0281170 A1   11/2011   Mitsuda et al.
(Continued)

FOREIGN PATENT DOCUMENTS

CN        101132066 A      2/2008
CN        104124428 A     10/2014
(Continued)

OTHER PUBLICATIONS

Machine translation of JP 2013196956, Sugawara Takeyuki, 2013 (Year: 2013).*
(Continued)

*Primary Examiner* — Kwang Han
(74) *Attorney, Agent, or Firm* — Lerner, David, Littenberg, Krumholz & Mentlik, LLP (57) ABSTRACT

The present disclosure relates to an electrode which is manufactured with ease and causes little damage during storage, and a method for manufacturing the same. The electrode includes a metallic current collector and an electrode mixture, wherein the current collector has a recess formed by denting the remaining portions except edge portions having a width, and the electrode mixture is embedded in the recess.

5 Claims, 7 Drawing Sheets

(51) Int. Cl.
- *H01M 4/70* (2006.01)
- *H01M 4/66* (2006.01)
- *H01M 4/139* (2010.01)
- *H01M 4/13* (2010.01)
- *H01M 4/04* (2006.01)
- *H01M 10/04* (2006.01)
- *H01M 4/62* (2006.01)
- *H01M 10/0525* (2010.01)
- *H01M 10/052* (2010.01)

(52) U.S. Cl.
CPC ............ *H01M 4/139* (2013.01); *H01M 4/62* (2013.01); *H01M 4/661* (2013.01); *H01M 4/70* (2013.01); *H01M 4/75* (2013.01); *H01M 10/04* (2013.01); *H01M 10/052* (2013.01); *H01M 10/0525* (2013.01); *Y02E 60/10* (2013.01); *Y02T 10/70* (2013.01)

(58) Field of Classification Search
CPC ...... H01M 4/70; H01M 4/0433; H01M 4/661; H01M 10/0525; H01M 4/13; H01M 4/139; H01M 10/0481; Y02E 60/122; Y02E 60/10; Y02T 10/7011; Y02T 10/70; Y02P 70/50
See application file for complete search history.

(56) References Cited

U.S. PATENT DOCUMENTS

| | | | |
|---|---|---|---|
| 2014/0147742 A1 | 5/2014 | Anastas et al. | |
| 2018/0316018 A1* | 11/2018 | Ohsawa | ............... H01M 4/624 |

FOREIGN PATENT DOCUMENTS

| | | | | |
|---|---|---|---|---|
| CN | 204088469 U | | 1/2015 | |
| EP | 2154741 A1 | | 2/2010 | |
| EP | 2806476 A1 | | 11/2014 | |
| JP | S38000985 B | | 2/1963 | |
| JP | S43017697 B | | 7/1968 | |
| JP | S43017698 B | | 7/1968 | |
| JP | S43017699 B | | 7/1968 | |
| JP | S53033327 A | | 3/1978 | |
| JP | S55093672 A | | 7/1980 | |
| JP | S58020474 U | | 2/1983 | |
| JP | H07272760 A | | 10/1995 | |
| JP | 2008016581 A | | 1/2008 | |
| JP | 2008277242 A | | 11/2008 | |
| JP | 2011048967 A | | 3/2011 | |
| JP | 2013026043 A | | 2/2013 | |
| JP | 2013-157082 | * | 8/2013 | ........ H01M 10/0585 |
| JP | 2013196956 | * | 9/2013 | ........ H01M 10/0566 |
| JP | 2015082421 A | | 4/2015 | |
| KR | 20090006004 A | | 1/2009 | |
| KR | 20140070751 A | | 6/2014 | |
| KR | 20150082958 A | | 7/2015 | |
| KR | 2015-0089470 | * | 8/2015 | .............. H01M 4/02 |
| KR | 20150089470 A | | 8/2015 | |

OTHER PUBLICATIONS

Machine translation of KR 2015-0089470, Hwan et al., 2015 (Year: 2015).*

Machine translation of JP 2013-157082, Oto, 2013 (Year: 2013).*

Extended European Search Report for Application No. EP16876057.7 dated Aug. 28, 2018.

Search report from International Application No. PCT/KR2016/014752, dated Apr. 3, 2017.

Chinese Search Report for Application No. 201680062946.8, dated Jul. 1, 2020, pp. 1-3.

* cited by examiner

METHOD FOR MANUFACTURING AN ELECTRODE HAVING A METAL PLATE WITH A RECESS FORMED THEREIN, AN ELECTRODE INCLUDING THE SAME, AND AN ELECTROCHEMICAL DEVICE INCLUDING THE SAME

CROSS-REFERENCE TO RELATED APPLICATIONS

The present application is a national phase entry under 35 U.S.C. § 371 of International Application No. PCT/KR2016/014752 filed on Dec. 15, 2016, which claims priority from Korean Patent Application No. 10-2015-0179363 filed on Dec. 15, 2015 and Korean Patent Application No. 10-2016-0086369 filed on Jul. 7, 2016 in the Republic of Korea, the disclosures of which are incorporated herein by reference.

TECHNICAL FIELD

The present disclosure relates to an electrode for an electrochemical device and an electrochemical device including the same. More particularly, the present disclosure relates to an electrode which is manufactured with ease and causes little damage during storage, and a method for manufacturing the same.

BACKGROUND ART

As technological development and a need for mobile instruments have increased, a demand for secondary batteries as energy sources has increased rapidly. Among such secondary batteries, lithium secondary batteries having high energy density and voltage, long cycle life and a low self-discharging rate have been commercialized and used widely.

In addition, as the attention to environmental problems has increased recently, active studies have been conducted about electric vehicles (EV) and hybrid electric vehicles (HEV) capable of substituting for vehicles using fossil fuel, including gasoline vehicles and diesel vehicles, one of the main causes of air pollution. As a power source for such electric vehicles (EV) and hybrid electric vehicles (HEV), nickel metal hydride (Ni-MH) secondary batteries have been used mainly. However, active studies have been conducted about application of lithium secondary batteries having high energy density, high discharge voltage and output stability and a part of such lithium secondary batteries have been commercialized.

Figure 1:
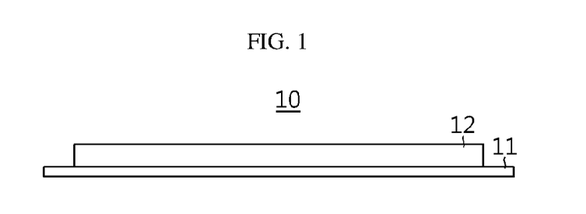
FIG. 1 is a schematic view illustrating the section of the conventional electrode.

In general, an electrode for such lithium secondary batteries is obtained by applying electrode slurry containing an electrode active material onto the top surface of an electrode current collector made of a metallic material, followed by pressurization/drying. FIG. 1 shows the sectional surface of a conventional electrode 10, which is provided with an electrode active material layer 12 including an electrode mixture coated on the top surface of a planar current collector 11. In general, it is required for an electrode to be manufactured to have a planar shape so that it may form a flat stacking surface and may not cause separation from another electrode or a separator upon stacking with the electrode or separator. However, an electrode active material is applied onto the top surface of a current collector in a semi-solid slurry state and thus cannot be applied smoothly and uniformly with ease. In addition, there is a problem in that when the slurry is heated and compressed to manufacture an electrode, the electrode active material contained in the slurry is separated. Further, after the completion of drying, the electrode may be damaged. For example, the electrode may be broken unintentionally and the active material may be separated during storage. Particularly, this may become severe at the lateral surfaces or edge portions of the electrode.

Therefore, there is a need for an electrode which is manufactured with ease and causes little damage during storage, and a method for manufacturing the same.

DISCLOSURE

Technical Problem

The present disclosure is designed to solve the problems of the related art, and therefore the present disclosure is directed to providing an electrode which is manufactured with ease and causes little damage during storage, and a method for manufacturing the same. In addition, the present disclosure is directed to providing a method for manufacturing an electrode which allows easy control of the electrode thickness. It will be easily understood that the objects and advantages of the present disclosure may be realized by the means shown in the appended claims and combinations thereof.

Technical Solution

In one aspect of the present disclosure, there is provided an electrode for an electrochemical device to solve the above-mentioned technical problems.

According to a first embodiment, there is provided an electrode for an electrochemical device which includes a metallic current collector and an electrode mixture, wherein the current collector has a recess formed by denting the remaining portions except edge portions having a width, the electrode mixture is embedded (filled) in the recess, and the surface of the electrode mixture has a pattern formed thereon.

According to a second embodiment, there is provided the electrode for an electrochemical device of the first embodiment, which is a positive electrode or negative electrode.

According to a third embodiment, there is provided the electrode for an electrochemical device of the first or second embodiment, wherein the section of the recess perpendicular to the plane of the current collector has a triangular, quadrangular or semi-circular shape.

According to a fourth embodiment, there is provided the electrode for an electrochemical device of any one of the first to the third embodiments, wherein the electrode mixture is surrounded with the current collector at the bottom surface and lateral surfaces thereof, and the top surface thereof is open.

According to a fifth embodiment, there is provided the electrode for an electrochemical device of any one of the first to the fourth embodiments, wherein the section of the recess perpendicular to the plane of the current collector has a quadrangular shape, and the depth of the recess equals to the height of the electrode mixture.

According to a sixth embodiment, there is provided the electrode for an electrochemical device of any one of the first to the fifth embodiments, wherein the pattern has one groove or at least two grooves on the surface of the electrode mixture.

According to a seventh embodiment, there is provided the electrode for an electrochemical device of the sixth embodiment, wherein the groove is a continuous or discontinuous linear concave furrow and/or a concave pinhole formed to have a height h from the surface.

According to an eighth embodiment, there is provided the electrode for an electrochemical device of the fifth embodiment, wherein the recess includes four lateral surfaces inside thereof and a bottom surface by which the lateral surfaces are connected, and at least one of the four lateral surfaces and the bottom surface has a convex portion protruding toward the inner side.

According to a ninth embodiment, there is provided the electrode for an electrochemical device of the eighth embodiment, wherein the convex portion is formed of a dot pattern or stripe pattern.

In another aspect of the present disclosure, there is also provided an electrode assembly including the electrode of any one of the first to the ninth embodiments. The electrode assembly includes a positive electrode, a negative electrode and a separator interposed between the positive electrode and the negative electrode, wherein the positive electrode and/or the negative electrode is the electrode as defined in any one of the first to the ninth embodiments.

According to an eleventh embodiment, there is provided the electrode assembly of the tenth embodiment, wherein the negative electrode and/or the positive electrode faces the separator at the open surface thereof.

In still another aspect of the present disclosure, there is provided an electrochemical device. According to a twelfth embodiment of the present disclosure, the electrochemical device is any one selected from the group consisting of a battery module including one or more electrodes and a battery pack including a plurality of battery modules, wherein at least one of the electrodes is the electrode as defined in any one of the first to the ninth embodiments.

In yet another aspect of the present disclosure, there is provided a method for manufacturing an electrode for an electrochemical device. According to a thirteenth embodiment of the present disclosure, the method includes the steps of: (S10) preparing a metallic plate for a current collector; (S20) molding the metallic plate for a current collector to form a recess; and (S30) embedding (filling) an electrode mixture in the recess formed in step (S20).

According to a fourteenth embodiment, there is provided the method of the thirteenth embodiment, wherein the molding is carried out by pressurizing the metallic plate with a press.

According to a fifteenth embodiment, there is provided the method of the fourteenth embodiment, wherein the electrode has a thickness controlled by adjusting the pressurizing depth of the press.

According to a sixteenth embodiment, there is provided the method of the thirteenth embodiment, wherein step (S30) includes the steps of: (S31) preparing a slurry for an electrode mixture; (S32) embedding the slurry prepared in (S31) in the recess; (S33) placing a mold having a pattern formed on one surface thereof on the surface of the embedded slurry; (S34) drying the slurry while the mold is placed thereon; and (S35) removing the mold from the dried electrode mixture, wherein step (S33) is carried out by placing the mold in such a manner that one surface of the mold having the pattern may be in contact with the surface of the slurry.

Advantageous Effects

In the electrode according to the present disclosure, the lateral side portions of an electrode active material layer is surrounded with a current collector, and thus there is provided an effect of reducing damages of an electrode at the lateral side or edge portions thereof.

In addition, the method for manufacturing an electrode according to the present disclosure allows easy control of the shape or thickness of an electrode. Particularly, when a desired pattern, such as surface irregularities, is formed on the electrode surface, it is possible to form a pattern with ease by using a mold having a corresponding pattern before drying the electrode mixture. Thus, since excessive heat or pressure is not applied to the dried electrode in order to form a pattern on the electrode surface, it is possible to prevent deterioration of the electrode. Finally, since the electrode according to the present disclosure has an increased area where a current collector faces an electrode active material layer, there is also provided an effect of increasing conductivity.

DESCRIPTION OF DRAWINGS

Other objects and aspects of the present disclosure will become apparent from the following descriptions of the embodiments with reference to the accompanying drawings. The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the term 'electrode assembly' refers to a stacked structure formed by stacking a negative electrode/separator/positive electrode successively. The electrode assembly includes one or more negative electrodes, one or more separators and one or more positive electrodes.

As used herein, the term 'unit cell' or 'unit battery' refers to a minimum unit which includes the above-mentioned electrode assembly and an electrolyte and is capable of electrochemical reaction, such as charge/discharge.

As used herein, the term 'battery', 'battery module' and/or 'battery pack' refers to electrochemical devices including one or more of the above-mentioned unit cells or unit batteries.

As used herein, the term 'electrochemical device' generally covers the electrode, electrode assembly, unit cell, unit battery, battery module and the battery pack.

Hereinafter, the present disclosure will be explained in detail.

The present disclosure relates to an electrode for an electrochemical device, an electrode assembly including the electrode, and an electrochemical device including the electrode and/or the electrode assembly. The present disclosure also relates to a method for manufacturing the electrode. According to an embodiment of the present disclosure, the electrode may be used for a secondary battery for electric vehicles (EV) and/or a secondary battery for electric power storage systems (ESS). According to another embodiment, the electrode may be a high-capacity electrode having a capacity of 2,400 mAh or more.

As used herein, the electrode includes a current collector and an electrode mixture. Herein, the electrode refers to a negative electrode or positive electrode, or both.

The current collector is formed integrally including edge portions having a predetermined width and a recess formed by denting the remaining portion except the edge portions, and the electrode mixture is embedded in the recess. According to an embodiment, the current collector has a bowl-like shape having a vacant space so that a material to be embedded therein may be received, and a rim having a predetermined width is formed at the circumference of the opening of the bowl.

Figure 2:
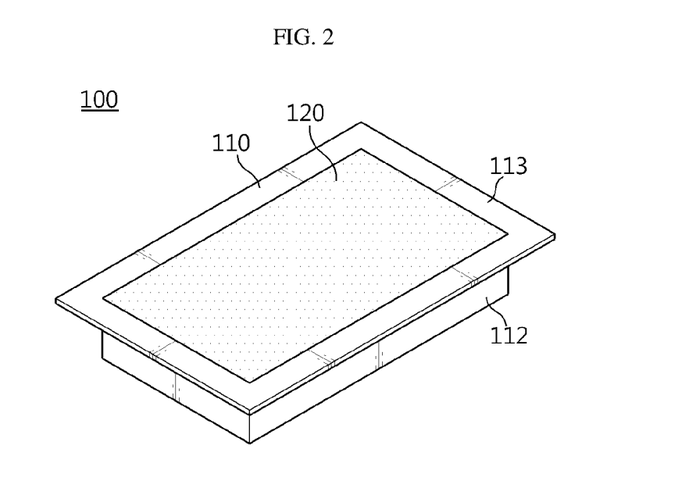
FIG. 2 is a schematic view illustrating the electrode according to an embodiment of the present disclosure.

FIG. 2 illustrates an electrode 100 according to an embodiment of the present disclosure. Hereinafter, the electrode according to the present disclosure will be explained in detail with reference to FIG. 2.

Referring to FIG. 2, the current collector 110 has a recess dented to have a predetermined depth. The recess may be formed to have various shapes. According to an embodiment of the present disclosure, the section of the recess perpendicular to the plane of the current collector may have a quadrangular, triangular or semi-circular shape, but is not limited thereto. In FIG. 2, the recess is exemplified by a hexahedron opened at one surface, particularly at the top surface thereof. However, this is merely one of the particular embodiments of the present disclosure provided to help understanding of the present disclosure, and the scope of the present disclosure is not limited thereto.

Meanwhile, the current collector includes edge portions extended from the recess and having a predetermined width. The edge portions may be subjected to stamping adequately during the manufacture of a battery to provide electrode tabs or portions to which separate electrode tabs are connected.

In the electrode according to the present disclosure, the electrode mixture 120 is embedded in the recess, and thus it is possible to prevent separation of the electrode active material during the storage of the electrode and to significantly reduce the frequency of damages caused by a collapse of the electrode mixture particularly at the electrode edge portions. As used herein, the term 'electrode mixture' may be used interchangeably with the term 'electrode active material layer' and refers to the same subject as the latter.

In addition, in the electrode according to the present disclosure, the bottom surface portion and the lateral surface portions of the electrode are surrounded with the current collector and the top surface is opened. According to an embodiment of the present disclosure, the height of the electrode mixture is preferably the same as the depth of the recess. Therefore, there is an effect of increasing the contact area between the current collector and the electrode active material, as compared to the conventional electrode as shown in FIG. 1.

For reference, in the description of embodiments of the present disclosure, the terms (top surface portion, bottom surface portion, lateral surface portions, or the like) related with directions or positions are set based on the arrangement of each configuration illustrated in the drawings. For example, when viewed from FIG. 1, the upper side may be the top surface portion, the lower side may be the bottom surface portion, and the portions connected between the top surface portions and the bottom surface portions may be lateral surface portions. However, various arrangements are possible in various actual applications of the embodiments according to the present disclosure, and for example, the top, bottom, left and right sides may be reversed.

Figure 3:
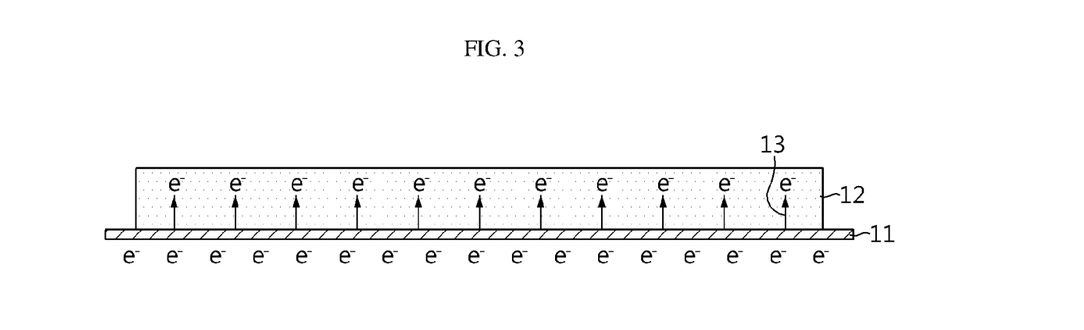
FIG. 3 illustrates transport of electrons in the conventional electrode.
Figure 4:
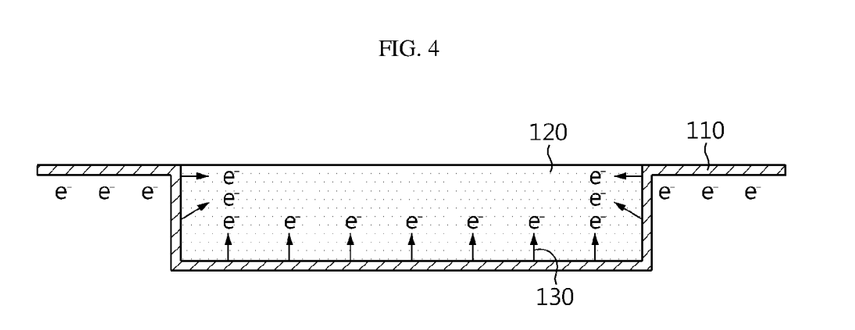
FIG. 4 illustrates transport of electrons in the electrode according to the present disclosure.

FIG. 3 is a schematic view illustrating transport of electrons in the conventional electrode, and FIG. 4 is a schematic view illustrating transport of electrons in the electrode according to the present disclosure. In the electrode of FIG. 3, the electrode active material layer faces the current collector only at the bottom surface portion thereof. On the contrary, in the electrode of FIG. 4, even the lateral surface portions of the electrode active material layer face the current collector. Therefore, when the same area of the bottom surface portion of the electrode active material layer is applied, the electrode according to the present disclosure provides an effect of improving conduction of electrons by the area of the lateral surface portions.

In another aspect, there is provided an electrode assembly including a negative electrode, a positive electrode and a separator interposed between the negative electrode and the positive electrode. In the electrode assembly, at least one of the positive electrode and the negative electrode may be the electrode according to the present disclosure. According to an embodiment of the present disclosure, both the negative electrode and the positive electrode of the electrode assembly may be the electrodes according to the present disclosure.

Meanwhile, according to an embodiment of the present disclosure, the electrode may have a predetermined pattern on the surface thereof.

The pattern increases the surface area of the electrode, and thus increases the reactivity. In addition, the pattern provides an effect of reducing a distance of transporting Li ions from the electrode surface to the inner part of the electrode, and thus improving the ion conductivity. Further, the pattern can provide a channel through which an electrolyte flows between the electrode and a separator, and thus can increase impregnation with the electrolyte.

Figure 5A:
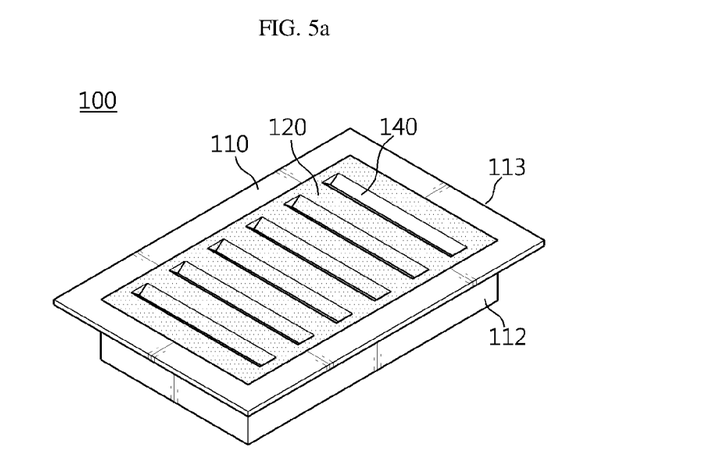
FIG. 5a and FIG. 5b illustrate the electrode having a pattern formed on the surface thereof according to an embodiment of the present disclosure.
Figure 5B:
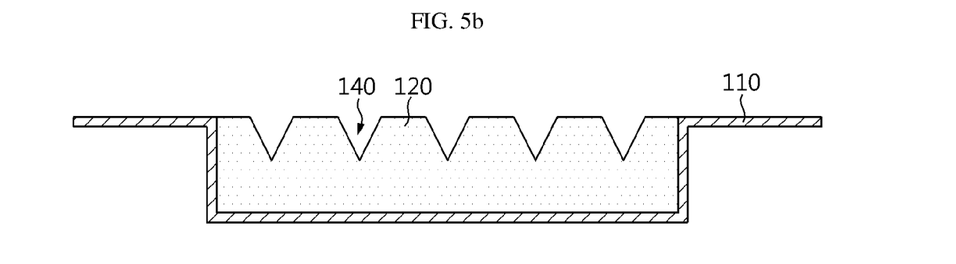

FIG. 5a and FIG. 5b illustrate an electrode having a pattern 140 according to an embodiment. Herein, the pattern may be formed in a shape of a concave groove having a predetermined depth h from the surface of the electrode. The groove may be formed in a shape of a continuous or discontinuous linear furrow, and one furrow or two or more furrows may be formed. In addition, the furrows may be formed in parallel with each other, or may be crossed with each other. The section of the pattern may have a triangular or reverse triangular shape as shown in FIG. 5. Otherwise, the section of the pattern may have a quadrangular, semi-circular, U-like or reverse trapezoidal shape, but is not limited thereto.

According to another embodiment, the pattern may have a concave pinhole shape formed to have a predetermined depth h, and an adequate number of pinholes may be formed with reference to the area of the electrode.

Figure 6:
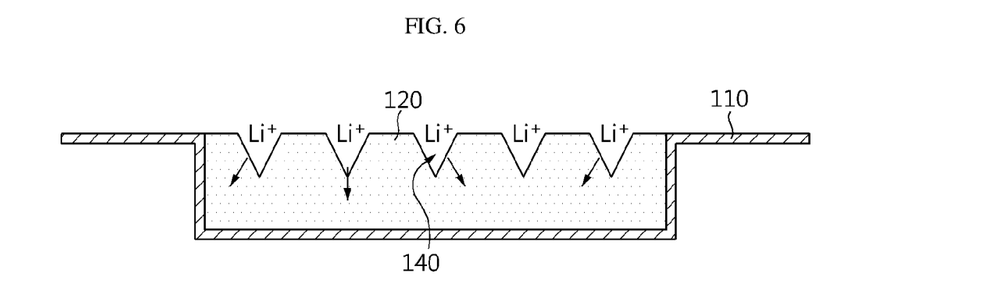
FIG. 6 is a schematic view illustrating the electrode having a pattern on the surface thereof according to an embodiment of the present disclosure, wherein transport of lithium ions are carried out more smoothly as compared to a planar electrode.

FIG. 6 is a schematic view illustrating a decrease in distance of transporting Li ions toward the inner part of the electrode, caused by formation of the pattern.

Figure 7:
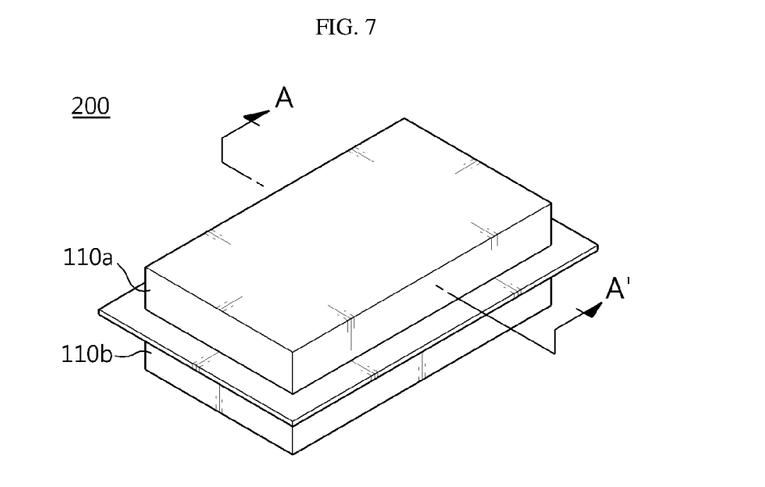
FIG. 7 illustrates an electrode assembly obtained by using the electrode according to the present disclosure.
Figure 8:
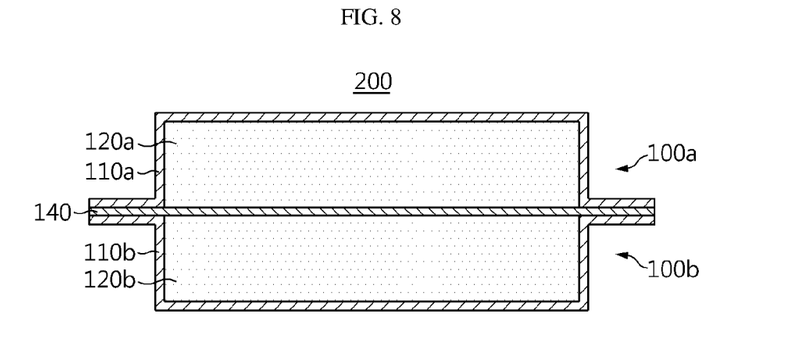
FIG. 8 shows the section taken along A-A' of FIG. 7.

FIG. 7 illustrates an electrode assembly 200 according to the present disclosure, wherein both the positive electrode 110a and the negative electrode 110b are the electrodes according to the present disclosure. FIG. 8 is a sectional view taken along A-A' of FIG. 7, wherein each of the opened portions in which the electrode active materials are exposed at the negative electrode and the positive electrode faces a separator.

Figure 11A:
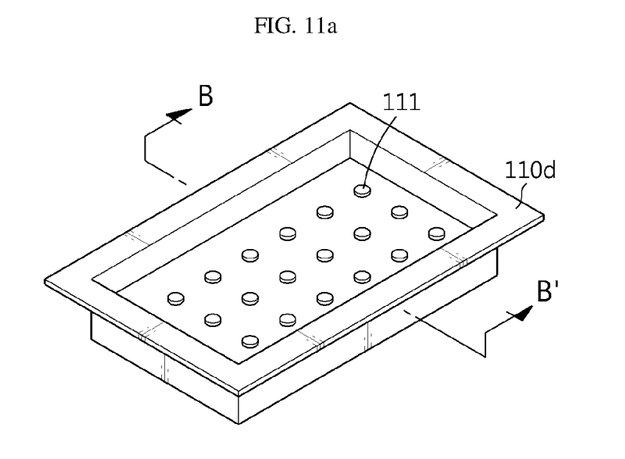
FIG. 11a and FIG. 11b are schematic views illustrating the bottom surface of the current collector in the electrode according to an embodiment of the present disclosure.
Figure 11B:
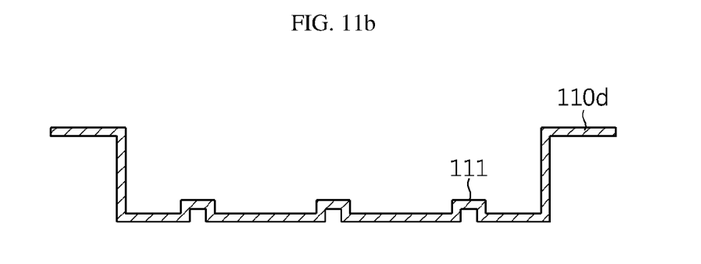

Meanwhile, according to an embodiment of the present disclosure, the recess may have a convex portion 111 protruding out toward the inner side of the recess on at least one surface of the lateral surface portions and/or bottom surface portion. For example, the convex portion may have a dot pattern, stripe pattern or both, but is not limited thereto. When such a convex portion is further provided on the surface of the recess, the surface area of the current collector is further increased. FIG. 11a and FIG. 11b are schematic views illustrating a convex portion 111 formed to allow protrusion of a part of the bottom surface of the recess of the current collector 110d according to an embodiment of the present disclosure.

In still another aspect, there is provided a method for manufacturing the electrode according to the present disclosure.

According to the present disclosure, the method for manufacturing the electrode includes the steps of: (S10) preparing a metallic plate for a current collector; (S20) molding the metallic plate for a current collector to form a recess; and (S30) embedding an electrode mixture in the recess formed in step (S20).

According to an embodiment of the present disclosure, the molding may be carried out by pressurizing the metallic plate with a press having a predetermined shape. Herein, the shape of the press may be formed to correspond to the shape of a desired electrode.

Figure 9A:
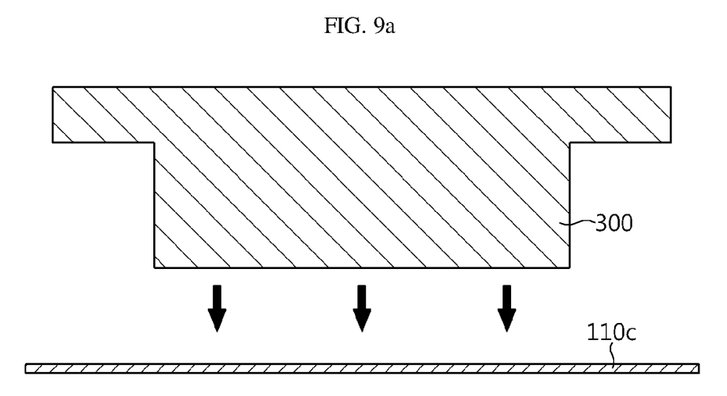
FIG. 9a-FIG. 9e show schematic views illustrating the method for manufacturing an electrode according to the present disclosure.

FIG. 9a-FIG. 9e are schematic views illustrating the method for manufacturing an electrode according to the present disclosure. Referring to the drawings, a metallic plate 110c for a current collector is prepared first, and then is disposed under a press 300 (FIG. 9a). Herein, the metallic plate may be supported by a supporting die (not shown), and the supporting die may have a shape corresponding to the shape of the press for the current collector.

Figure 9B:
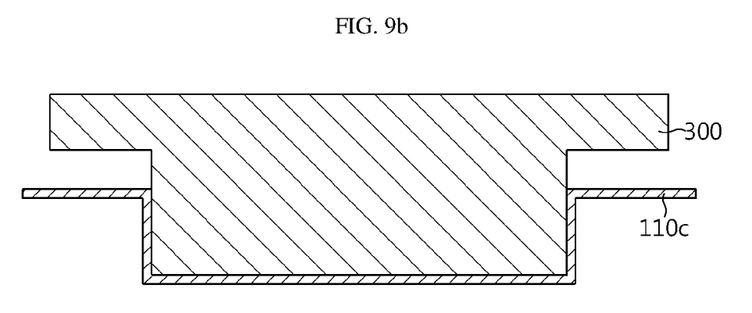
Figure 9C:
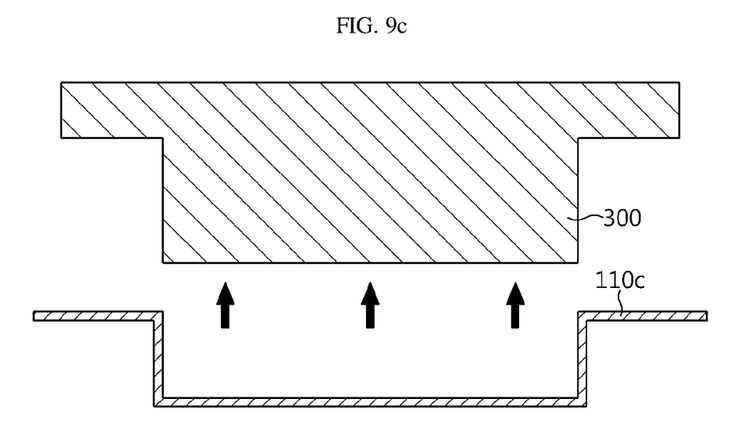
Figure 9D:
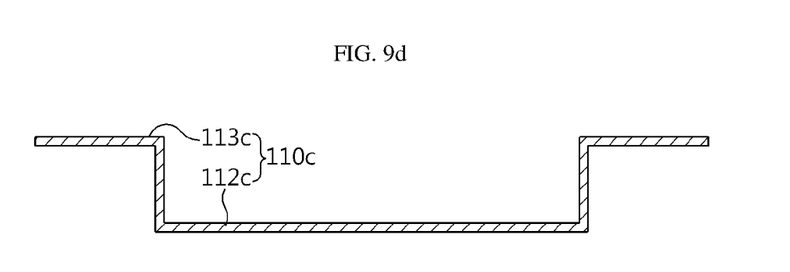
Figure 9E:
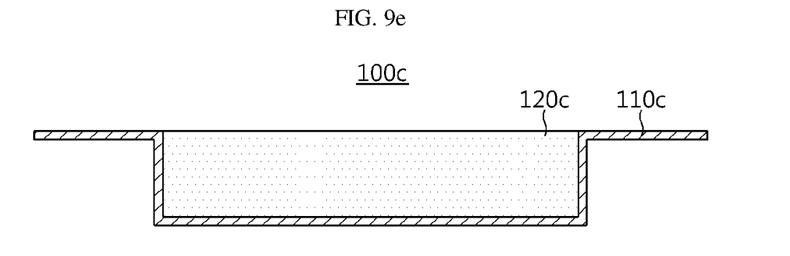

Next, the metallic plate is pressurized with the press to form a recess (FIG. 9b). Herein, the metallic plate and/or the press may be heated to an adequate temperature. Upon the pressurization, the height of the electrode is determined by the depth of pressurization. Therefore, it is possible to control the height of the electrode by adjusting the depth of pressurization. It is easier to control the height of the electrode as compared to the conventional method for manufacturing an electrode by controlling the height of the electrode through the height of the recess. In addition, it is possible to prevent a problem of separation of an electrode active material occurring when pressurizing slurry in the conventional method for manufacturing an electrode. Once the recess is formed in the current collector through the above-described method, the press is removed (FIG. 9c and FIG. 9d), and an electrode mixture is embedded in the recess to provide an electrode (FIG. 9e).

After the electrode mixture is embedded, the top surface of the electrode mixture may be pressurized by using an adequate press. Herein, the mixture may be heated to a predetermined temperature so that the binder contained in the mixture may be bound to firmly to the electrode active material.

Meanwhile, when the electrode mixture is pressurized, the lateral surface portions of the recess may function to support the mixture so that the electrode active material may not be separated during the pressurization of the electrode mixture. Thus, it is possible to prevent degradation of capacity of the electrode.

Figure 10:
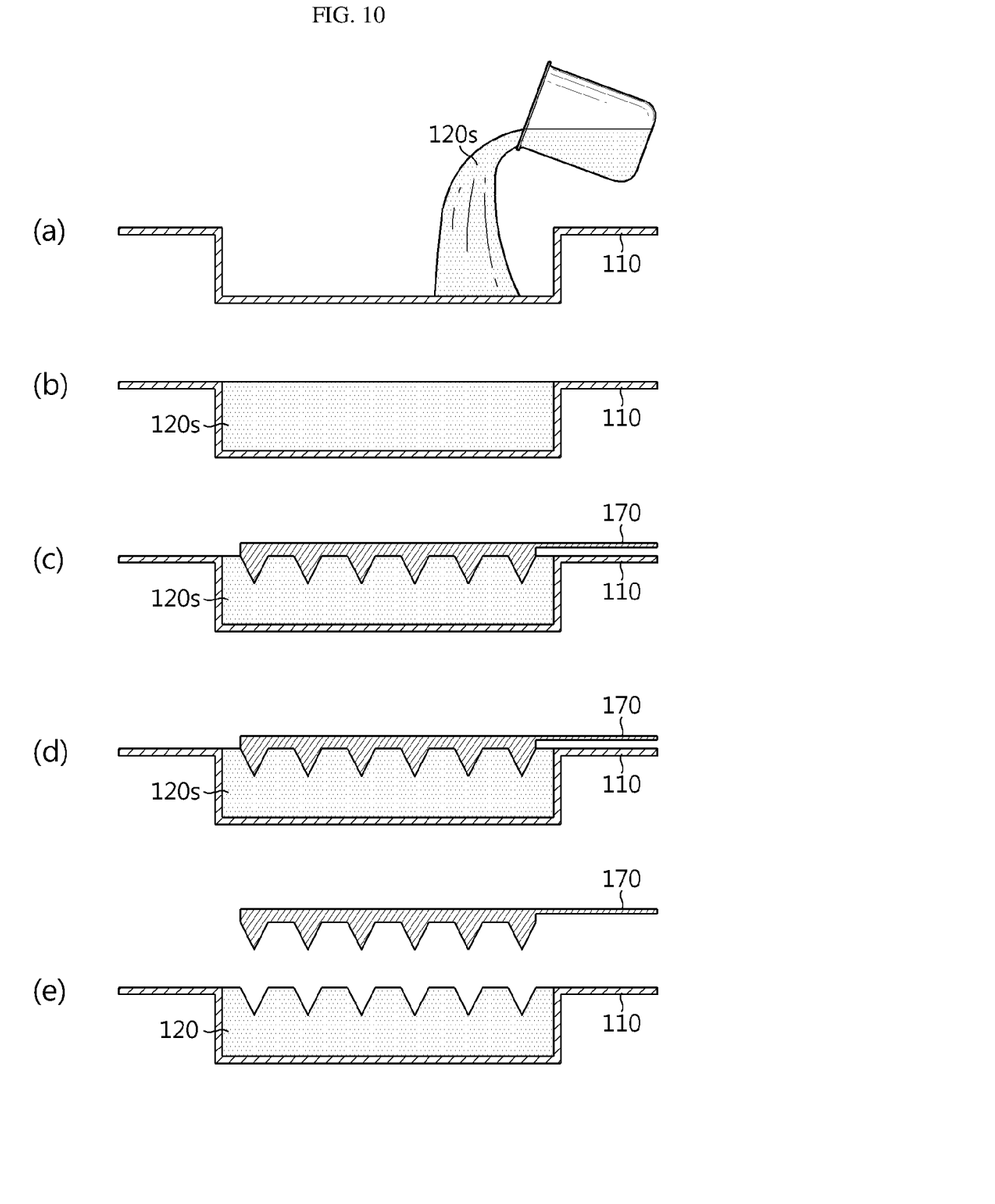
FIG. 10 is a schematic view illustrating the method for manufacturing an electrode having a surface pattern according to an embodiment of the present disclosure.

In addition, according to an embodiment of the present disclosure, a pattern may be formed on the electrode surface while step (S30) is carried out. FIG. 10 is a schematic view illustrating the method for manufacturing an electrode having a pattern on the surface thereof according to an embodiment of the present disclosure. Hereinafter, the method for forming a pattern on the surface of the electrode will be explained with reference to FIG. 10.

First, slurry 120s for an electrode mixture is prepared (S31), and the slurry is introduced to the recess formed in the current collector (S32). After leveling the slurry smoothly, a mold 170 having a predetermined pattern is disposed on the surface of the electrode slurry (S33). According to an embodiment of the present disclosure, the mold may be a plate-like frame having a convex pattern corresponding to a pattern to be formed on the electrode. Since the convex pattern of the mold is placed on non-dried slurry, a concave pattern corresponding thereto is formed in the slurry even under the condition of ambient pressure. Next, after the slurry is dried while the mold is placed thereon (S34), the mold is removed (S35). Meanwhile, because the non-dried slurry 120s has flowability, a pattern may not be formed when the mold is removed. Therefore, it is preferred that the mold is not removed until the slurry is solidified to form an electrode mixture 120 to such a degree that the pattern may be retained even after removing the mold.

In general, the dried surface of the electrode is pressurized with a pressurizing member having a pattern under heating to form a pattern on the electrode surface. In this case, the dried electrode active material layer may be broken by pressurization, the shape thereof may be deformed and the electrode active material may be deteriorated by the temperature applied thereto. On the contrary, the method for forming a pattern according to the present disclosure includes placing a mold on the slurry before drying and then carrying out drying. Thus, it is possible to eliminate the disadvantages, such as deformation or deterioration of the electrode active material, as described above. Meanwhile, when using a planar electrode current collector, there is a problem in that the shape of electrode slurry is not fixed, when a pattern is formed by using a mold on the flowable electrode slurry. However, according to the present disclosure, the recess formed in the electrode current collector fixes the shape of the slurry so that the non-dried slurry may not flow. As a result, it is easy to form a pattern by using a mold.

According to an embodiment of the present disclosure, the current collector may be a positive electrode current collector or a negative electrode current collector. The current collector is not particularly limited, as long as it causes no electrochemical change and is stable. When the current collector is corroded, it is not possible to realize sufficient current collectability as battery cycles are repeated, resulting in degradation of the life of a battery. Preferably, the current collector may be formed of stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

The electrode mixture layer includes a mixture containing an electrode active material and a binder polymer. The mixture may further include ingredients, such as a conductive material, favorable to the performance of an electrode. The electrode active material is a negative electrode active material or positive electrode active material, and conforms to the polarity of an electrode depending on the purpose of manufacture.

When the electrode is a positive electrode, it may include, as a positive electrode active material, a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-x}O_4$ (wherein x is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-x}M_xO_2$ (wherein M is Co, Mn, Al, Cu, Fe, Mg, B or Ga, and x is 0.01-0.3); a lithium manganese composite oxide represented by the chemical formula of $LiMn_{2-x}M_xO_2$ (wherein M=Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; $LiNi_xMn_{2-x}O_4$ ($0.01 \le x \le 0.6$); or the like.

In addition, according to an embodiment of the present disclosure, particular examples of the negative electrode active material may include: carbon and graphite materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds containing the above elements; metals and metallic compounds, and composite compounds of carbon and graphite materials; lithium-containing nitrides; or the like. Among them, a carbonaceous material is preferred and particular examples thereof include at least one selected from the group consisting of graphite-based carbon, cokes-based carbon and hard carbon.

When the electrode is a positive electrode or negative electrode, the conductive material include carbonaceous materials, such as natural graphite, artificial graphite, carbon black, acetylene black, ketjen black, carbon fibers or vapor grown carbon fibers (VGCF); metal powder, such as silver, or metallic materials, such as metallic fibers; conductive polymers, such as polyphenylene derivatives; or the like.

When the electrode is a positive electrode or negative electrode, the binder polymer functions to adhere positive electrode active material particles or negative electrode active material particles well to each other and to attach a negative electrode active material to a current collector. Particular examples of the binder polymer include but are not limited to: polyimide, polyamideimide, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymers, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like.

Any separator may be used with no particular limitation, as long as it can be used conventionally as a separator material for an electrochemical device. Particular examples of the separator include a porous polymer film or non-woven web made of at least one selected from polymer resins, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide or polyethylene naphthalene. In addition, according to an embodiment of the present disclosure, the separator may be a stacked separator including at least two different substrates stacked successively.

In still another aspect, there is provided an electrochemical device including the electrode assembly. The electrochemical device may be manufactured by injecting an electrolyte to the electrode assembly.

The electrolyte includes a non-aqueous solvent and a lithium salt. Herein, the non-aqueous solvent may further include at least one selected from carbonate-based, ester-based, ether-based, ketone-based, alcohol-based and aprotic solvents. The carbonate-based solvents may include dimethyl carbonate (DMC), diethyl carbonate (DEC), dipropyl carbonate (DPC), methyl propyl carbonate (MPC), ethyl proyl carbonate (EPC), methyl ethyl carbonate (MEC), ethylene carbonate (EC), propylene carbonate (PC), butylene carbonate (BC), or the like. The ester-based solvents may include methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvents may include dibutyl ether, tetraglyme, diglyme, dimethoxyethane, 2-methyltetrahydrofuran, tetrahydrofuran, or the like. The ketone-based solvents may include cyclohexanone, or the like. In addition, the alcohol-based solvents may include ethyl alcohol, isopropyl alcohol, or the like. The aprotic solvents may include nitriles, such as R—CN (wherein R is a C2-C20 linear, branched or cyclic hydrocarbon group and may include a double bond, aromatic ring or ether bond), amides, such as dimethylformamide, dioxolanes, such as 1,3-dioxolane, sulfolanes, or the like.

The lithium salt is a material dissolved in an organic solvent and functions as a source for lithium ions in a battery to allow fundamental operation of a lithium secondary battery, and accelerates transport of lithium ions between a positive electrode and a negative electrode. According to the present disclosure, the lithium salt may be used at a concentration of 0.1 mol/L-2 mol/L in an electrolyte. The lithium salt may further include any one or at least two selected from the group consisting of LiFSI, $LiPF_6$, $LiBF_4$, $LiSbF_6$, $LiAsF_6$, $LiN(SO_2C_2F_5)_2$, $Li(CF_3SO_2)_2N$, LiN $(SO_3C_2F_5)_2$, $LiC_4F_9SO_3$, $LiClO_4$, $LiAlO_2$, $LiAlCl_4$, LiN ($C_xF_{2x+1}SO_2$)($C_yF_{2y+1}SO_2$) (wherein each of x and y represents a natural number), LiCl, LiI and $LiB(C_2O_4)_2$ (lithium bis(oxalato) borate; LiBOB).

The other battery elements not described herein may be those used generally in the field of electrochemical devices, particularly in the field of lithium secondary batteries.

According to the present disclosure, the electrochemical device includes any device which carries out electrochemical reaction, and particular examples thereof include all types of primary batteries, secondary batteries, fuel cells, solar cells or capacitors such as super capacitor devices. Particularly, the secondary batteries may include lithium secondary batteries, including lithium metal secondary batteries, lithium ion secondary batteries, lithium polymer secondary batteries or lithium ion polymer ion batteries.

The present disclosure has been described in detail with reference to particular embodiments and drawings. However, it should be understood that the present disclosure is not limited to the detailed description and specific examples, and various changes and modifications within the scope of the disclosure will become apparent to those skilled in the art from this detailed description.

What is claimed is:

1. A method for manufacturing an electrode for an electrochemical device, comprising:
    molding a metallic plate to form a recess in the metallic plate;
    embedding a slurry containing an electrode mixture in the recess;
    contacting a mold having a pattern formed on a surface thereof to an exposed surface of the embedded slurry to imprint the pattern in the exposed surface;
    drying the slurry while the mold is contacting the embedded slurry to form an electrode, the electrode including the electrode mixture embedded in the recess of the metallic plate, and having the pattern imprinted in the exposed surface thereof; and
    removing the mold from the electrode,
    wherein the recess is defined by four lateral surfaces and a bottom surface, wherein the four lateral surfaces extending from a top surface of the metallic plate, wherein the four lateral surfaces are connected to the bottom surface, and
    wherein the dried electrode mixture contacts the bottom surface and the four lateral surfaces thereof, and a height of the dried electrode mixture is the same as a depth of the recess.

2. The method for manufacturing an electrode for an electrochemical device according to claim 1, wherein the molding comprises:
    pressurizing the metallic plate with a press to form the recess.

3. The method for manufacturing an electrode for an electrochemical device according to claim 2, comprising:
    adjusting the pressurizing depth of the press to control a thickness of the electrode.

4. The method according to claim 1, wherein and at least one of the four lateral surfaces or the bottom surface has at least one convex portion protruding into the recess.

5. The method according to claim 1, where the imprinted pattern has at least one concave groove.

* * * * *